: 11/12/85

United States Patent [19]
Titchmarsh et al.

[11] Patent Number: 4,552,433
[45] Date of Patent: Nov. 12, 1985

[54] OPTICAL FIBRE CABLE MANUFACTURE

[75] Inventors: James G. Titchmarsh, Harlow; Peter G. Hale, Writtle, both of England

[73] Assignee: Standard Telephones and Cables, plc, London, England

[21] Appl. No.: 534,250

[22] Filed: Sep. 21, 1983

[30] Foreign Application Priority Data

Sep. 22, 1982 [GB] United Kingdom ............... 8227034

[51] Int. Cl.[4] .......................... G02B 5/16; G02B 5/14; D02G 3/00; B32B 9/00
[52] U.S. Cl. ................................. 350/96.23; 428/377; 428/392; 350/96.33
[58] Field of Search ................ 350/96.3, 96.33, 96.34, 350/96.23; 428/377, 392, 375

[56] References Cited

FOREIGN PATENT DOCUMENTS 1125554 6/1982 Canada .................... 350/96.23

OTHER PUBLICATIONS

*Laser Focus*, vol. 17, No. 11, Nov. 1981, p. 132.

*Primary Examiner*—George F. Lesmes
*Assistant Examiner*—Beverly K. Johnson
*Attorney, Agent, or Firm*—Kerkam, Stowell, Kondracki and Clarke

[57] ABSTRACT

A cabling machine for making single optical fibre cable with two layers of stranded armid yarn enclosed in a yarn outer wrap which employs a vertical axis for cabling and uses peripheral pay-off of the aramid yarn (34,39) from bobbins 33 mounted on a pair of separately driven turntables (21,22) and peripheral pay-off of the yarn wrap (45) from a spool (44).

5 Claims, 2 Drawing Figures

OPTICAL FIBRE CABLE MANUFACTURE

This invention relates to optical fibre cable manufacture. For certain types of application, particularly though not necessarily exclusively where the cable is required to be free-flooding, it is desirable to hold the stranded cable elements together, not with tape wrap, but with a wrap of yarn applied with a lay length so short as to provide adjacent, abutting or overlapping turns. Conventional cabling machines work horizontally, but it has been found that in order to achieve an acceptable line speed with this form of wrapping it is necessary to employ a cabling machine that operates with a vertical axis.

According to the present invention there is provided a cabling machine for cabling optical fibre, which machine includes, in axial alignment one or more motor driven stranding turntables substantially vertically beneath a yarn wrapping motor driven spool carriage, and means for drawing a cable central element on said axis upwardly through the turntable(s) and spool carriage, wherein the or each turntable is provided with a plurality of bobbin carriages each provided with means for paying off a filament from its bobbin under controlled tension through an associated guide in or secured to the turntable and positioned such that the guides are equispaced around the axis, and wherein the spool carriage is provided with means for peripheral pay-off of yarn from the spool under controlled tension.

(The carrier for the yarn wrap has been referred to as a spool rather than as a bobbin in order to facilitate making the distinction between it and the carriers on the turntable(s) for the filaments.)

The invention also resides in a method of making an optical fibre cable, wherein the central element of the cable is drawn upwardly through one or more motor driven stranding turntables and a motor driven yarn wrapping spool carriage arranged on a common axis with, and substantially vertically above, the turntable(s), wherein rotation of at least one of the turntables is employed to strand a plurality of filaments in a layer around the central element which filaments are dispensed under controlled tension from bobbins mounted on that turntable and fed via guides equispaced around the axis and rotating with the turntable, and wherein rotation of the spool carriage is employed to wrap with adjacent, abutting or overlapping turns yarn dispensed peripherally under controlled tension from a spool mounted on the spool carriage. The invention further resides in cable made this method.

The central element may be a plastics packaged optical fibre, and the stranded filaments may be strength member yarns for instance of aramid fibre. These may be stranded in two layers in a configuration providing substantial torque balance.

It is generally preferred to pay off the strength member yarn filaments peripherally from their reels on the turntables.

Alternatively the central element may be strength member, or plastics packaged optical fibre, around which are stranded a set of packaged optical fibres. Typically these are stranded in a single layer, though these may be covered with a layer of stranded strength members before the application of the yarn wrapping. In this case it is preferred to pay off the packaged optical fibres tangentially from the turntable reels for stranding. Backtwist may advantageously be provided when paying off the packaged optical fibres.

The invention further provides a single fibre optical cable that can be dispensed under water in which a glass optical fibre having an internal optical waveguiding structure which is made of silica or of multicomponent glass, forms the central core of the cable, and is encased in two or more plastics coatings to form a plastics packaged optical fibre, which are stranded in opposite senses first and second layers of high modulus plastics yarns, the cable being completed by a liquid permeable outer wrap of yarn with abutting or overlapping turns.

BRIEF DESCRIPTION OF THE DRAWING

There follows a description of a particular optical fibre cable and of its cabling on a cabling machine embodying the invention. The description refers to the accompanying drawings in which.

DETAILED DESCRIPTION OF THE DRAWINGS

Figure 1:
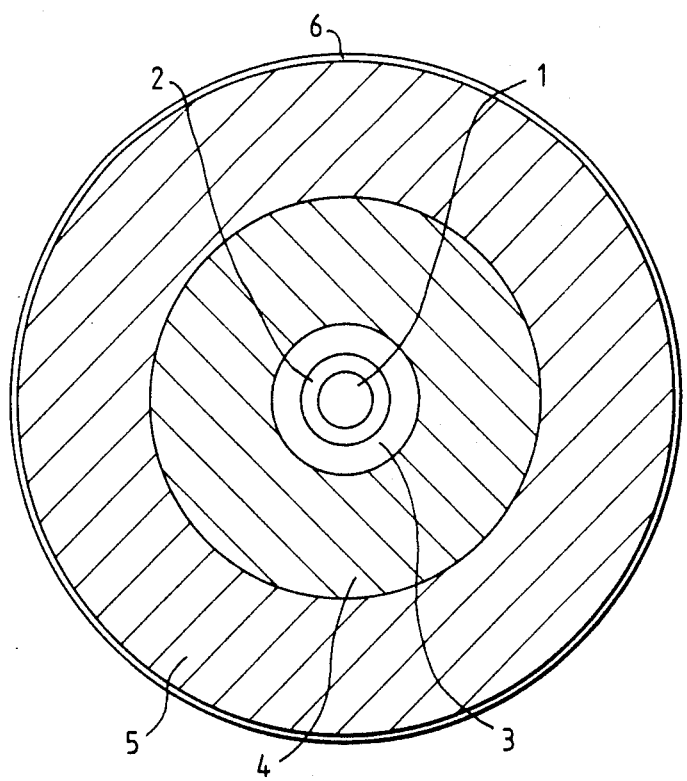
FIG. 1 depicts schematically a cross-section of the cable.

The cable of FIG. 1 is a design developed for dispensing relatively rapidly under water from a drum. For this purpose a design is preferred that is relatively compact having regard to its strength in order to minimise the volume requirements of the drum, and one that incorporates sufficient torque compensation to minimise the risks of kinks being produced during pay-off of the cable at high speed. Referring to FIG. 1, the optical fibre of this particular cable is a multimode graded index doped silica fibre 1 made by a vapour deposition process. The diameter of the fibre is 125 microns, with core diameter 50 microns. This fibre was given a primary plastics coating 2 of a silicone resin on-line with the drawing of the fibre in order to protect the surface of the freshly drawn fibre from degradation by atmospheric attack. The thickness of this coating is typically 50 microns, and it was covered with a high modulus secondary plastics coatings 3 by extrusion taking the diameter of the fibre package typically up to 0.4 mm. The primary functions of this secondary coating are to protect the fibre against gross deformation in handling and, by virtue of its high modulus, to afford some protection against microbending. Its contribution to the ultimate tensile strength of the completed cable is of much less importance.

The package, comprising the optical fibre together with its primary and secondary coatings, forms a core around which are stranded an inner layer 4 of four 1578 dtex high modulus yarns of 12 to 13 micron aramid filaments marketed under the registered trade mark KEVLAR 49, which is itself covered by an outer layer 5 of seven more of these yarns stranded with the opposite handedness. This division of the eleven yarns is found to give adequate torque compensation, but an exact balance may be achieved by making an adjustment to the relative magnitudes of their lay lengths. Alternatively torque balance can be achieved with a different division of the yarns between the inner and outer layers. With the preferred division of four to seven it is found that satisfactory performance is achieved with a lay length that is approximately equal to twice the minimum bend radius that can be tolerated by the completed cable without producing microbending problems arising from the columnar collapse of the yarns as they go into compression on the inside of the bend radius. A typical lay length is 10 cm.

The cable is completed by an outer wrap 6 to cover the yarns completely and keep them in position. A suitable material for this outer wrap is a crimped polyester yarn, and a 30 filament 150 dtex yarn has been found satisfactory when wrapped at a pitch of about 2000 turns per meter to give full cover of the underlying strength member aramid yarns. The crimped yarn allows free flooding of the cable and is also preferred to the use of an extruded sheath because it is lighter and thinner. In this example the adjacent turns of the yarn are in substantially abutting relationship. The purpose of the wrapping is to maintain package integrity and it is not absolutely necessary for the adjacent turns to abutt or overlap. Satisfactory results have been achieved with a wrap providing a space between adjacent turns of approximately half a wrap width.

Figure 2:
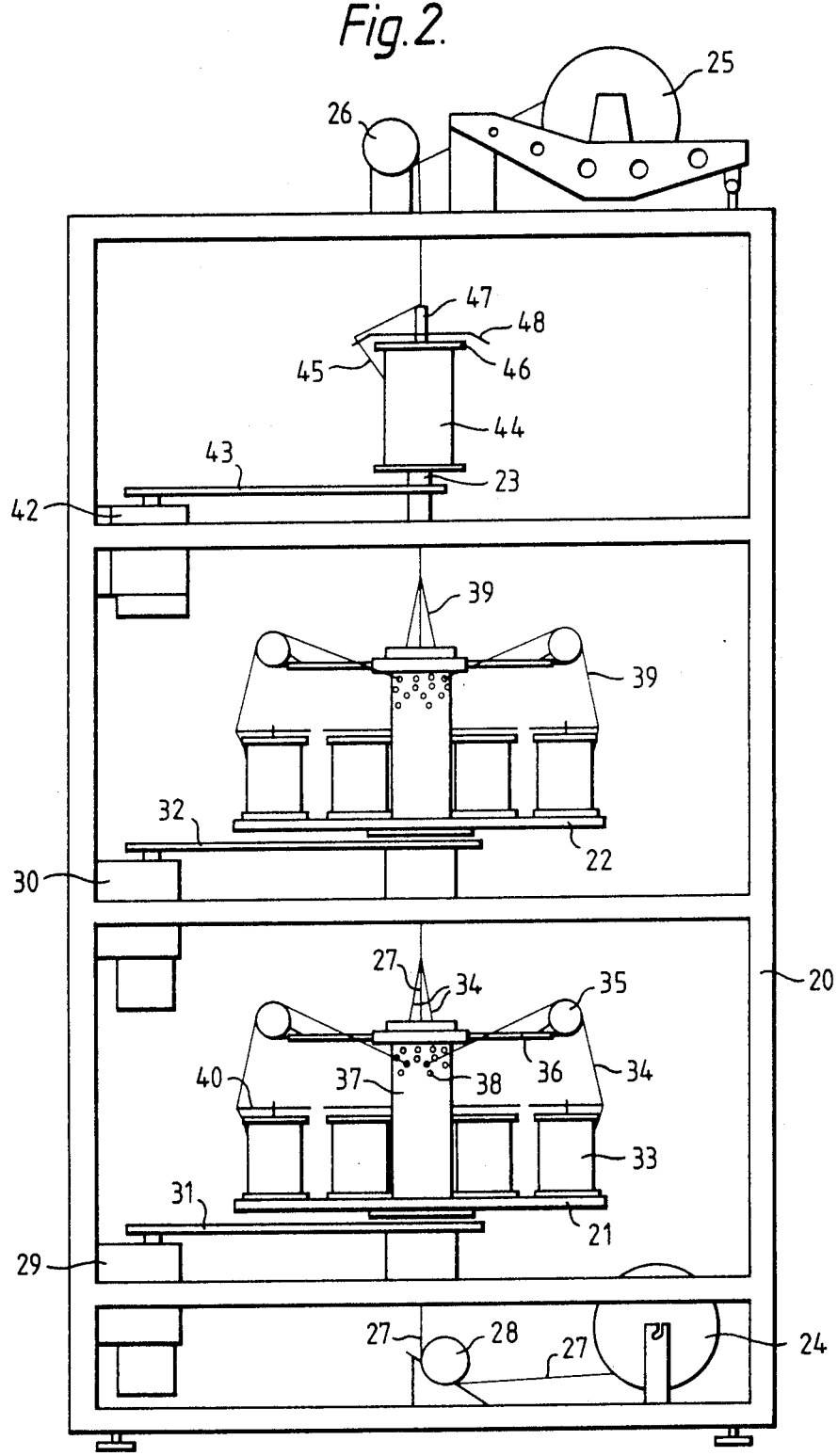
FIG. 2 depicts the cabling machine.

The manner in which the packaged fibre is cabled, and the construction of the cabling machine employed will now be described with particular reference to FIG. 2. The cabling machine has a frame 20 supporting two motor driven turntables 21 and 22, a spool carriage 23, mountings for pay-off and take up drums 24 and 25 and a rubber surfaced drive capstan 26. Packaged optical fibre 27, that is the glass core of FIG. 1 together with its primary and secondary plastics coatings 2 and 3, is paid off under tension from drum 24 and passes under pulley 28 from where it is drawn vertically upwards by the capstan 26 along the common axis of the two turntables and the spool carriage. The pulley 28 has a precise diameter, and also serves as the length counter via a revolution counter (not shown).

The two turntables are driven by separate motors 29 and 30, which act through drive belts 31 and 32 drive the turntables in either direction typically at up to 300 revolutions per minute at any desired speed. Each turntable is provided with a set of mountings for holding bobbins 33. Typically each turntable can accommodate eight bobbins. To form the inner layer 4 (FIG. 1) of aramid reinforcement yarns individual yarns 34 are taken peripherally from four of the eight bobbins 33 and fed via flyers 40 over cymbal friction brakes 35 mounted on arms 36 connected to a tubular portion 37 of the turntable so that each brake is positioned vertically above it associated bobbin. The individual yarns are fed from the friction brakes 35 through guides in the form of ceramic bush inserts 38 in the tube that are equispaced around its periphery, and from there the yarns extend upwardly towards the packaged fibre 27, becoming stranded around it by the rotation of the turntable. The bushes are arranged in four rows having respectively five, six, seven and eight equispaced members to the row in order to make provision for the stranding of different numbers of yarns.

The upper turntable 22 is just like the lower one, but in this instance individual yarns 39 to form the outer layer 5 (FIG. 1) are taken from seven of the eight bobbins of the upper turntable and these yarns are taken from their friction brakes through a different row of bushes 38, the row of seven bushes.

Above the upper turntable lies the spool carriage 23, powered by a motor 42 via a drive belt 43 and carrying a spool 44 of the crimped polyester yarn for the outer wrap 6 (FIG. 1). For some applications adequate tensioning of the yarn 45 is achieved by loading it so that it is drawn across the upper cheek 45 of the spool direct to the top of the spool carriage, which here has the form of a hollow spindle 47 surrounding a stationary hollow spindle (not shown) which is provided to prevent chafing of the aramid yarns 39. Alternatively larger values of tension can be achieved by taking (as depicted in FIG. 2) the yarn to the top of the spool carriage by way of a conventional flyer 48 freely mounted on the rotating spindle. The tension provided by this flyer can be adjusted by making modifications to its windage or to its mass and hence its inertia and friction.

The lay length of the wrap is determined by the ratio between the line speed and the speed of rotation of the spool. In this particular instance the drive for the spool is designed to allow the spool speed to be continuously variable up to a limit of 7000 revolutions per minute.

The line speed is maintained by passing the assembled cable around the capstan 26 driven by a variable speed drive system (not shown). The cable is then paid on to the drum 25 driven by a constant torque motor (not shown), which also provides a variable speed traverse (not shown) to avoid cable pile up on the drum.

Modifications are normally necessary if either of the turntables 21 and 22 are to be used for stranding packaged optical fibres around the central element of the cable. This is because the ceramic bushes 38 are liable to impose too small a bending radius upon the fibres to be acceptable and because the use of a peripheral pay-off introduces too much twisting of the fibres to be generally acceptable. For these reasons the equipment of a turntable to be used for standing optical fibres will normally be changed to provide tangentical pay-off and backtwist from its reels after the manner of a conventional planetary strander.

We claim:

1. A single fibre optical cable that can be dispensed under water in which a glass optical fibre having an internal optical waveguiding structure forms the central core of the cable, and is encased in two or more plastic coatings the first of which is applied to the optical fibre to form a plastics packaged optical fibre, around which are stranded in opposite senses first and second layers of high modulus plastics yarns, the cable being completed by a liquid permeable outer wrap of yarn with adjacent abutting or overlapping turns.

2. A cable as claimed in claim 1, wherein the yarns is made of aramid fibre.

3. A cable as claimed in claim 1 wherein the internal waveguiding structure comprises silica.

4. A cable as claimed in claim 1, wherein the relative number and lay lengths of the yarns in the first and second layers is such as to provide substantial torque balance.

5. A cable as claimed in claim 4, wherein the outer yarn is made of crimped fibre.

* * * * *